US012659223B2

(12) United States Patent (10) Patent No.: US 12,659,223 B2
Caswell (45) Date of Patent: Jun. 16, 2026

(54) CELLULAR NETWORK CORE MANAGEMENT SYSTEM

(71) Applicant: Boost SubscriberCo LLC, Englewood, CO (US)

(72) Inventor: Justin Wayne Caswell, Centennial, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 3 days.

(21) Appl. No.: 17/356,976

(22) Filed: Jun. 24, 2021

(65) Prior Publication Data

US 2021/0410017 A1 Dec. 30, 2021

Related U.S. Application Data

(60) Provisional application No. 63/044,106, filed on Jun. 25, 2020.

(51) Int. Cl.
| | |
|---|---|
| *H04L 41/0806* | (2022.01) |
| *H04L 41/0896* | (2022.01) |
| *H04L 41/12* | (2022.01) |
| *H04L 43/08* | (2022.01) |
| *H04W 4/02* | (2018.01) |
| *H04W 16/18* | (2009.01) |
| *H04W 24/02* | (2009.01) |

(Continued)

(52) U.S. Cl.
CPC ...... *H04L 41/0806* (2013.01); *H04L 41/0896* (2013.01); *H04L 43/08* (2013.01); *H04W 4/025* (2013.01); *H04W 16/18* (2013.01); *H04W 24/02* (2013.01); *H04W 24/10*

(2013.01); *H04W 28/0268* (2013.01); *H04W 28/20* (2013.01); *H04W 28/24* (2013.01); *G06N 20/00* (2019.01); *H04L 41/12* (2013.01)

(58) Field of Classification Search
CPC ..... H04W 28/24; H04W 4/025; H04W 16/18; H04W 24/02; H04W 24/10; H04W 28/0268; H04W 28/20; G06N 20/00; H04L 41/0806; H04L 41/044; H04L 41/145; H04L 43/08; H04L 41/0896; H04L 41/12; H04L 41/16
See application file for complete search history.

(56) References Cited

U.S. PATENT DOCUMENTS

| | | | |
|---|---|---|---|
| 10,659,619 B2 | 5/2020 | Shaw et al. | |
| 2016/0105821 A1* | 4/2016 | Senarath | H04W 28/24 |
| | | | 370/329 |

(Continued)

OTHER PUBLICATIONS

International Search Report and Written Opinion for PCT/US2021/039025 mailed Oct. 13, 2021, all pages.

*Primary Examiner* — Derrick W Ferris
*Assistant Examiner* — M Mostazir Rahman
(74) *Attorney, Agent, or Firm* — Kilpatrick Townsend & Stockton LLP

(57) ABSTRACT

Various arrangements for managing a core cellular network of a cellular network are presented herein. A core network management system can receive a provisioning request for a plurality of user equipment (UE). Performance data from a plurality of cellular network data centers can be obtained and analyzed. An architecture of the core cellular network can be modified based on a machine learning model based on analyzing the performance data and the provisioning request.

13 Claims, 6 Drawing Sheets

(51) Int. Cl.

| | |
|---|---|
| *H04W 24/10* | (2009.01) |
| *H04W 28/02* | (2009.01) |
| *H04W 28/20* | (2009.01) |
| *H04W 28/24* | (2009.01) |
| *G06N 20/00* | (2019.01) |

(56)                  References Cited

U.S. PATENT DOCUMENTS

| | | | |
|---|---|---|---|
| 2018/0316799 A1* | 11/2018 | Shaw ................. | H04L 41/0806 |
| 2019/0116506 A1* | 4/2019 | Bendlin ............. | H04W 64/003 |
| 2020/0106677 A1 | 4/2020 | Pathak | |
| 2021/0168027 A1* | 6/2021 | Parulkar ............... | G06F 9/4856 |
| 2021/0297925 A1* | 9/2021 | Berzin ............. | H04W 28/0268 |

* cited by examiner

500

Provide cellular network access to user equipment
510

Obtaining status data from core cellular network nodes
520

Create a cellular network model based on the status data
530

Analyzing the cellular network model, the status data, and desired QoS metrics
540

Modifying the architecture of the cellular network based on the analysis
550

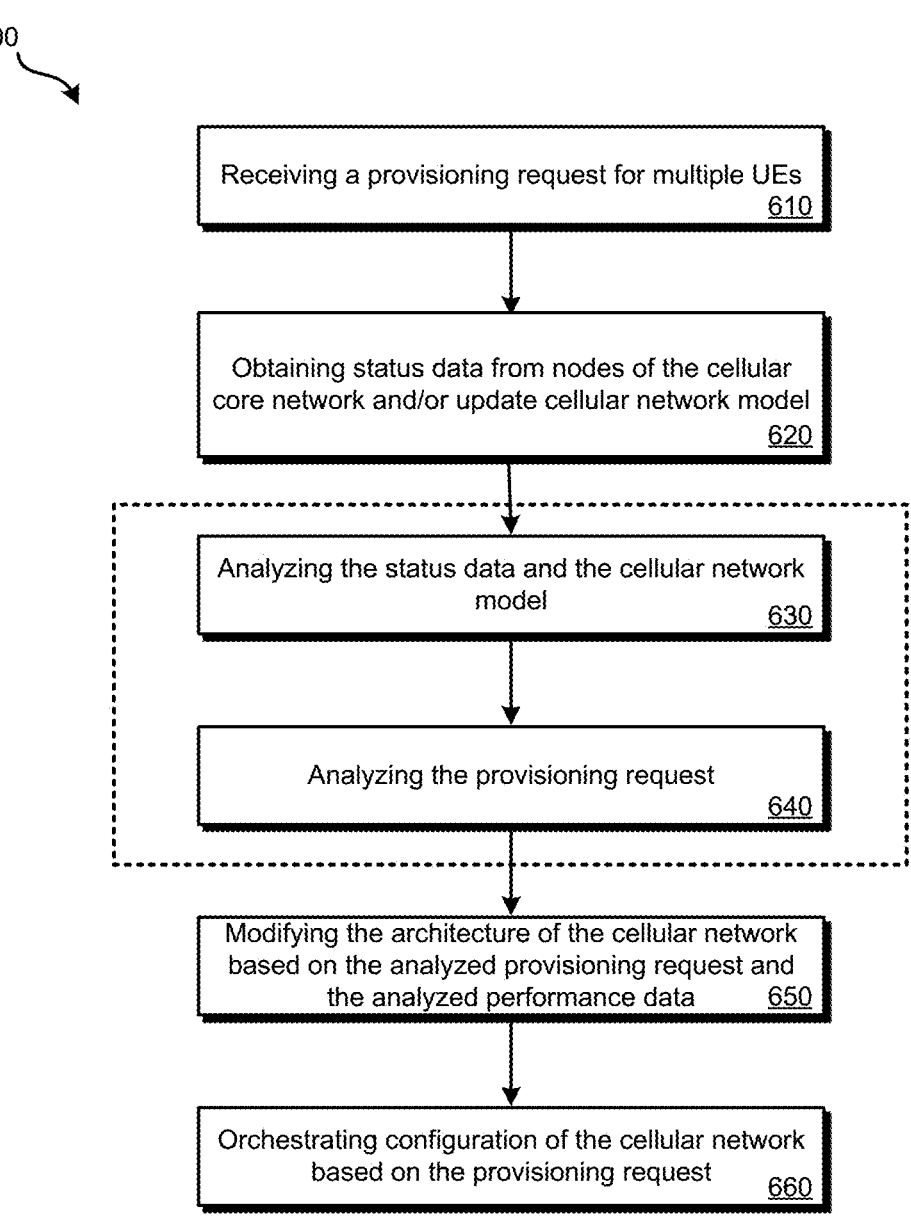

600

Receiving a provisioning request for multiple UEs
610

Obtaining status data from nodes of the cellular
core network and/or update cellular network model
620

Analyzing the status data and the cellular network
model
630

Analyzing the provisioning request
640

Modifying the architecture of the cellular network
based on the analyzed provisioning request and
the analyzed performance data        650

Orchestrating configuration of the cellular network
based on the provisioning request
660

FIG. 6

CELLULAR NETWORK CORE MANAGEMENT SYSTEM

CROSS-REFERENCE TO RELATED APPLICATIONS

This application claims priority to U.S. Provisional Patent Application No. 63/044,106, filed on Jun. 25, 2020, entitled "Cellular Network Core Management System," the disclosure of which is hereby incorporated by reference in its entirety for all purposes.

BACKGROUND

The architecture of cellular networks can be highly complex. Typically, human administrators analyze the performance of the various portions of the cellular network to determine modifications or upgrades that need to be implemented. Such an arrangement can be slow and inconsistent because it requires a high level of manual input. By relying on human input, the cellular network may not react quickly or sufficiently to current changes or anticipated changes in cellular network usage.

SUMMARY

Various embodiments are described related to a method for managing a core cellular network of a cellular network. In some embodiments, a method for managing a core cellular network of a cellular network is described. The method may include receiving, by a core network management system, a provisioning request for a plurality of user equipment (UE) from a client. The provisioning request may comprise a quality of service (QoS) metric required to be met by the cellular network. The method may comprise obtaining, by the core network management system, performance data from a plurality of cellular network data centers. The plurality of cellular network data centers may comprise data centers of different tiers within a hierarchy of the core cellular network. The method may comprise analyzing, by the core network management system, the performance data from the plurality of cellular network data centers and the provisioning request. The method may comprise modifying, by the core network management system, an architecture of the core cellular network based on analyzing the performance data and the provisioning request.

Embodiments of such a method may include one or more of the following features: the provisioning request may indicate a location where the plurality of UE will connect with the cellular network. Analyzing the performance data and the provisioning request may comprise analyzing the location where the plurality of UE will connect with the cellular network. Modifying the architecture of the core cellular network may comprise obtaining dedicated bandwidth between two data centers of the plurality of cellular network data centers which previously did not communicate directly. Modifying the architecture of the core cellular network may comprise obtaining dedicated bandwidth between a data center of the plurality of cellular network data centers and a cloud service provider. Modifying the architecture of the core cellular network may comprise increasing dedicated bandwidth between two data centers of the plurality of cellular network data centers which previously communicated directly. Modifying the architecture of the core cellular network may comprise reserving a dedicated amount of bandwidth in a geographic location on a radio access network (RAN) of the cellular network based on the provisioning request. The provisioning request may comprise an indication of the geographic location. The method may further comprise maintaining, by the core network management system, a cellular network model that may comprise: a representation of the plurality of cellular network data centers; reservations of bandwidth on the RAN of the cellular network; bandwidth available between cellular network data centers of the plurality of cellular network data centers; and bandwidth available between cellular network data centers and cloud service providers. Analyzing the performance data from the plurality of cellular network data centers and the provisioning request may comprise using a pre-trained machine learning model.

In some embodiments, a cellular network system of a cellular network is described. The system may comprise a core network management system. The core network management system may comprise a data center interface. The core network management system may comprise a network control interface. The core network management system may comprise an operations interface. The core network management system may comprise one or more processors, configured to receive a provisioning request for a plurality of user equipment (UE) from a client via the operations interface. The provisioning request may comprise a quality of service (QoS) metric required to be met by the cellular network. The one or more processors may be configured to obtain performance data from a plurality of cellular network data centers via the data center interface. The plurality of cellular network data centers may comprise data centers of different tiers within a hierarchy of a core cellular network. The one or more processors may be configured to analyze the performance data from the plurality of cellular network data centers and the provisioning request. The one or more processors may be configured to cause an architecture of the core cellular network to be modified via the network control interface based on analyzing the performance data and the provisioning request.

Embodiments of such a system may include one or more of the following features: the plurality of cellular network data centers may comprise: a national data center; a plurality of regional data centers; and a plurality of edge data centers. An edge data center of the plurality of edge data centers may be part of a satellite gateway. The one or more processors being configured to analyze the performance data and the provisioning request may comprise the one or more processors being configured to analyze the location where the plurality of UE will connect with the cellular network. The one or more processors being configured to cause the architecture of the core cellular network to be modified may comprise the one or more processors causing dedicated bandwidth to be obtained between two data centers of the plurality of cellular network data centers which previously did not communicate directly. The one or more processors being configured to cause the architecture of the core cellular network to be modified may comprise the one or more processors causing dedicated bandwidth between a data center of the plurality of cellular network data centers and a cloud service provider to be obtained. The one or more processors being configured to cause the architecture of the core cellular network to be modified may comprise the one or more processors being configured to increase dedicated bandwidth between two data centers of the plurality of cellular network data centers which previously communicated directly. The one or more processors being configured to cause the architecture of the core cellular network to be modified may comprise the one or more processors being configured to reserve a dedicated amount of bandwidth in a geographic location on a radio access network (RAN) of the cellular network based on the provisioning request. The provisioning request may comprise an indication of the geographic location. The system may further comprise a cellular network model database that may comprise a representation of the plurality of cellular network data centers. The cellular network model database may further comprise reservations of bandwidth on the RAN of the cellular network. The cellular network model database may further comprise bandwidth available between cellular network data centers of the plurality of cellular network data centers. The cellular network model database may further comprise bandwidth available between cellular network data centers and cloud service providers. The system may further comprise an artificial-intelligence based network manager that may analyze the performance data from the plurality of cellular network data centers. The artificial-intelligence based network manager may create the provisioning request based on a pre-trained machine learning model.

In some embodiments, a non-transitory processor-readable medium comprising processor-readable instructions is described. The processor-readable instructions may be configured to cause one or more processors to receive a provisioning request for a plurality of user equipment (UE) from a client. The provisioning request may comprise a quality of service (QoS) metric required to be met by the cellular network. The one or more processors may obtain performance data from a plurality of cellular network data centers. The plurality of cellular network data centers may comprise data centers of different tiers within a hierarchy of a core cellular network. The one or more processors may analyze the performance data from the plurality of cellular network data centers and the provisioning request using a machine-learning model. The one or more processors may cause an architecture of the core cellular network to be modified based on analyzing the performance data and the provisioning request using the machine-learning model.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 6 illustrates an embodiment of a method for modifying a cellular network based on a client provisioning request.

DETAILED DESCRIPTION

Arrangements detailed herein manage highly complex cellular network architectures. Arrangements detailed herein can modify properties of the cellular network architecture based on detected and anticipated changes in usage. The cellular network architecture can be modified to accommodate client-specific quality of service (QoS) metrics, and to ensure consistent network performance.

In order to monitor and modify the cellular network, a core network management system may be in communication with cellular network components across all levels of the cellular network hierarchy. For instance, a radio access network (RAN) may allow cellular devices (e.g., smartphones, modems, sensor devices, collectively referred to as user equipment or "UE") to communicate wirelessly with a base station (BS) or other form of cellular network access point (AP). These BSs and APs may communicate with edge data centers (EDCs), which are components of the cellular core network that are used for communication routing outside of the wireless link between the UE and BSs/APs. EDCs may communicate with regional data centers (RDCs), which, in turn, can communicate with national data centers (NDCs). Some of these EDCs, RDCs, and NDCs may have dedicated bandwidth for communication with one or more cloud service providers, which may host processing capabilities and/or storage for clients of the cellular network.

The core network management system, using an artificial intelligence (AI) based system can modify the cellular network to adjust to current or predicted conditions. The training data used to train the artificial intelligence learning may be at least in part based upon previous modifications to the cellular network approved or determined by an administrator or may be non-implemented network modifications that represent ideal or near-ideal responses to particular conditions. Once trained, the core network management system may be permitted to modify the architecture of the cellular network or otherwise optimize the cellular network without any or significant administrator input.

Figure 1:
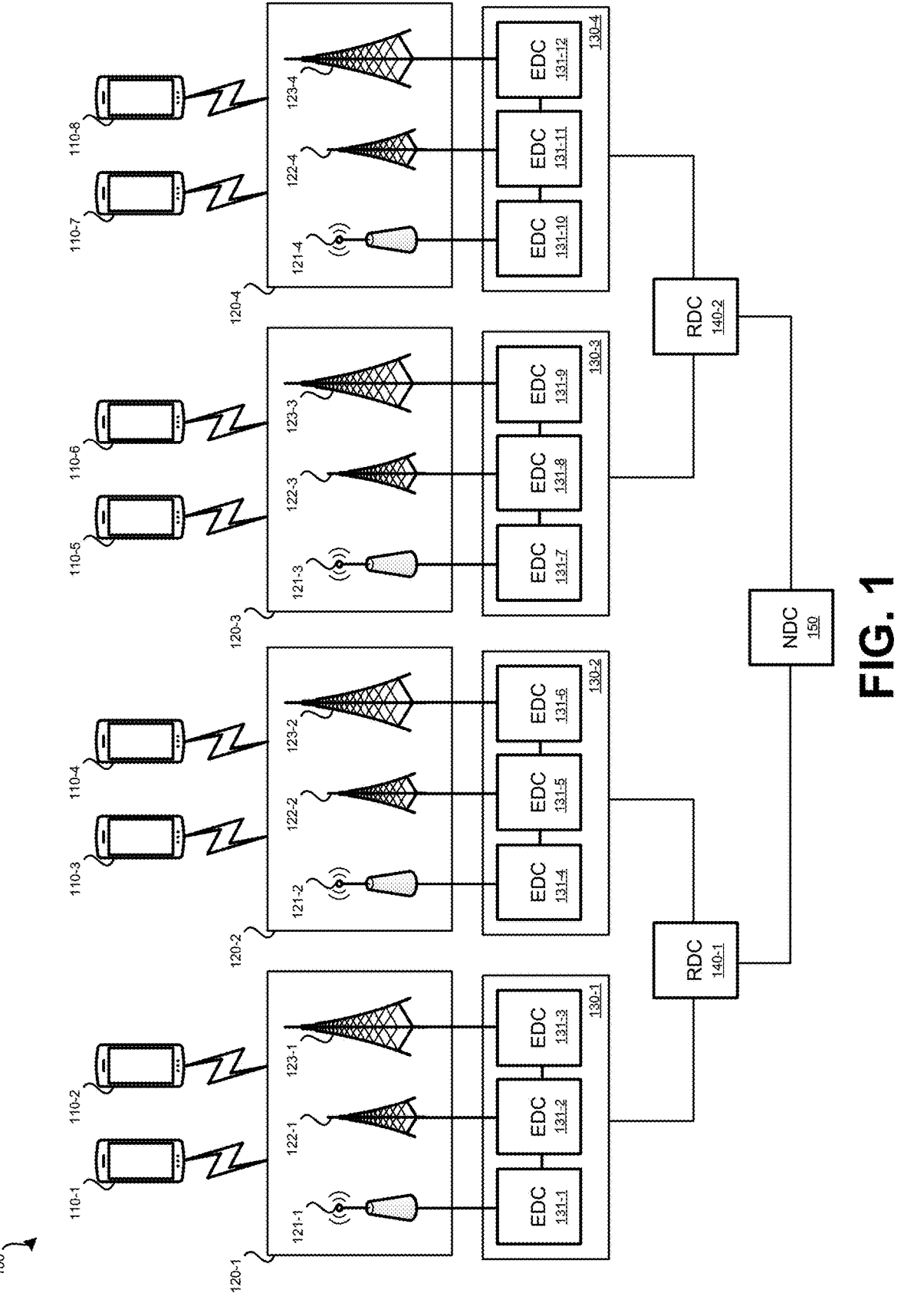
FIG. 1 illustrates an embodiment of a hierarchical cellular network.

FIG. 1 illustrates an embodiment of a hierarchical cellular network system 100 ("system 100"). A cellular network can include a radio access network (RAN) and a core cellular network. UE 110 may connect with the cellular network using various types of base stations or access points. UE can include: cellular phones; smart phones; modems; sensor devices; or any other form of wireless device that communicates with a cellular network. UE 110 may be in different geographical locations and may therefore use different components of the RAN of the cellular network to communicate with the cellular network.

UE 110-1 and UE 110-2, based on where they are located, may communicate with some or all of RAN components 120-1. RAN components 120-1 can include local AP 121-1, small BS 122-1, and large BS 123-1 (e.g., a gNodeB in a 5G New Radio (NR) cellular network). Local AP may provide coverage to a relatively small geographic area, such as within a house or building. Small BS 122-1 may provide cellular network access over an intermediate-sized geographical region and may have a capacity to handle fewer instances of UE than other base stations. For instance, small BS 122-1 may be installed in an urban environment to provide access within a neighborhood. Large BS 123-1 may provide cellular network coverage to a relatively large geographic area, such as along a highway or to cover a large neighborhood. Large BS 123-1 may have a capacity to handle a greater number of instances of UE than a small BS.

Local AP 121-1, small BS 122-1, and large BS 123-1 may be part of a cellular network that operates according to one or more radio access technologies (RATs). For instance, the cellular network may be a 5G NR, 4G LTE, 3G, or GSM-based cellular network. Cellular networks may operate according to multiple RATs. For instance, a cellular network may be a hybrid 4G and 5G network.

Each of local AP 121-1, small BS 122-1, and large BS 123-1 may communicate with an edge data center (EDC). In some embodiments, a dedicated EDC may be used for each component or each type of component of the RAN. For example, EDC 131-3 may be dedicated to large BS 123-1. In other embodiments, EDC 131-3 may serve multiple base stations in a geographic region. EDC 131-2 may be dedicated to small BS 122-1 or may serve multiple base stations (e.g., only small base stations or a mix of different size base stations). Similarly, EDC 13-1 may be dedicated to local AP 121-1 or a group of local APs.

Group of EDCs 130-1 may serve as the interface of the cellular core network and may communicate with the components of the RAN. EDCs 131-1, 131-2, and 131-3 may perform routing of data within the cellular core network. For example, data received by EDC 131-2 intended for UE in communication with large BS 123-1 may be routed to EDC 131-3 directly. However, not all EDCs 131 communicate directly with each other. For instance, EDC 131-4 may not communicate directly with EDC 131-2. Therefore, if EDC 131-2 is routing data to an UE in communication with EDC 131-3, the data may need to be routed via another data center of the cellular core network, such as through regional data center (RDC) 140-1. In this example, RDC 140-1 serves as an intermediary node that routes data between EDC 131-2 and EDC 131-4.

Each RDC, such as RDC 140-1, may serve primarily to route data among different data centers. RDC 140-1 may be in communication with multiple EDCs. If data is to be routed among EDCs in direct communication with RDC 140-1, components higher in the hierarchy of the cellular core network may not need to be involved in the routing of data. However, if data is being routed to an EDC not in direct communication with RDC 140-1, a component higher in the hierarchy of the cellular core network may need to be used to complete the routing.

National data center (NDC) 150 can represent the highest level in the cellular network hierarchy of system 100. NDC 150 may communicate with all RDCs 140 of the cellular core network. In turn, all of RDCs 140 may be in communication with the EDCs 131 of the cellular network. Such a hierarchy can allow for data anywhere within the cellular network to be routed to other devices. EDCs, RDCs, and NDCs can collectively be referred to as nodes of the core cellular network.

As can be seen in FIG. 1, the configuration of RAN components 120-1 and group of EDCs 130-1 are replicated in other geographic regions: UEs 110-3 and 110-4 communicate with RAN components 120-2 (local AP 121-2, small BS 122-2, large BS 123-2), which communicate with group of EDCs 130-2; UE 110-5 and UE 110-6 communicate with RAN components 120-3 (local AP 121-3, small BS 122-3, large BS 123-3), which communicate with group of EDCs 130-3; and UEs 110-7 and 110-8 communicate with RAN components 120-4 (local AP 121-4, small BS 122-4, large BS 123-4), which communicate with group of EDCs 130-4. Group of EDCs 130-2 (which includes EDCs 131-4, 131-5, and 131-6) communicate with RDC 140-1. Group of EDCs 130-3 (which includes EDCs 131-7, 131-8, and 131-9) and group of EDCs 130-4 (which includes EDCs 131-10, 131-

11, and 131-12) communicate with RDC 140-2. RDC 140-2 communicates with NDC 150.

In the example of system 100, only a small number of components are illustrated. For example, only UE 110-3 and UE 110-4 are shown as in communication with RAN components 120-2. In reality, a much larger number of UE may use RAN components 120-2 to communicate with the cellular network. Similarly, each group of RAN components 120 may include many more local APs 121, small BSs 122, and/or large BSs 123. Fewer or greater numbers of EDCs 131 may be present. There are fewer or greater numbers of levels within the hierarchy within the core cellular network. For example, in a cellular network if a greater number of EDCs are present, one or more additional levels in the hierarchy below the NDC may be present.

In system 100, the hierarchy is symmetrical in that each grouping of RAN components 120 contains a local AP, small BS, and a large BS. Each of the RAN components is in communication with an EDC, and each group of EDCs is in communication with an RDC, which is in communication with an NDC. Such an arrangement is unlikely to be implemented in the real-world due to variances in the density of UEs in a given area, variations in the amount of uplink and downlink traffic by UEs in a given area, variations in geography, temporal usage trends, where UE tend to congregate, connections with cloud-service providers, and availability of bandwidth.

Figure 2:
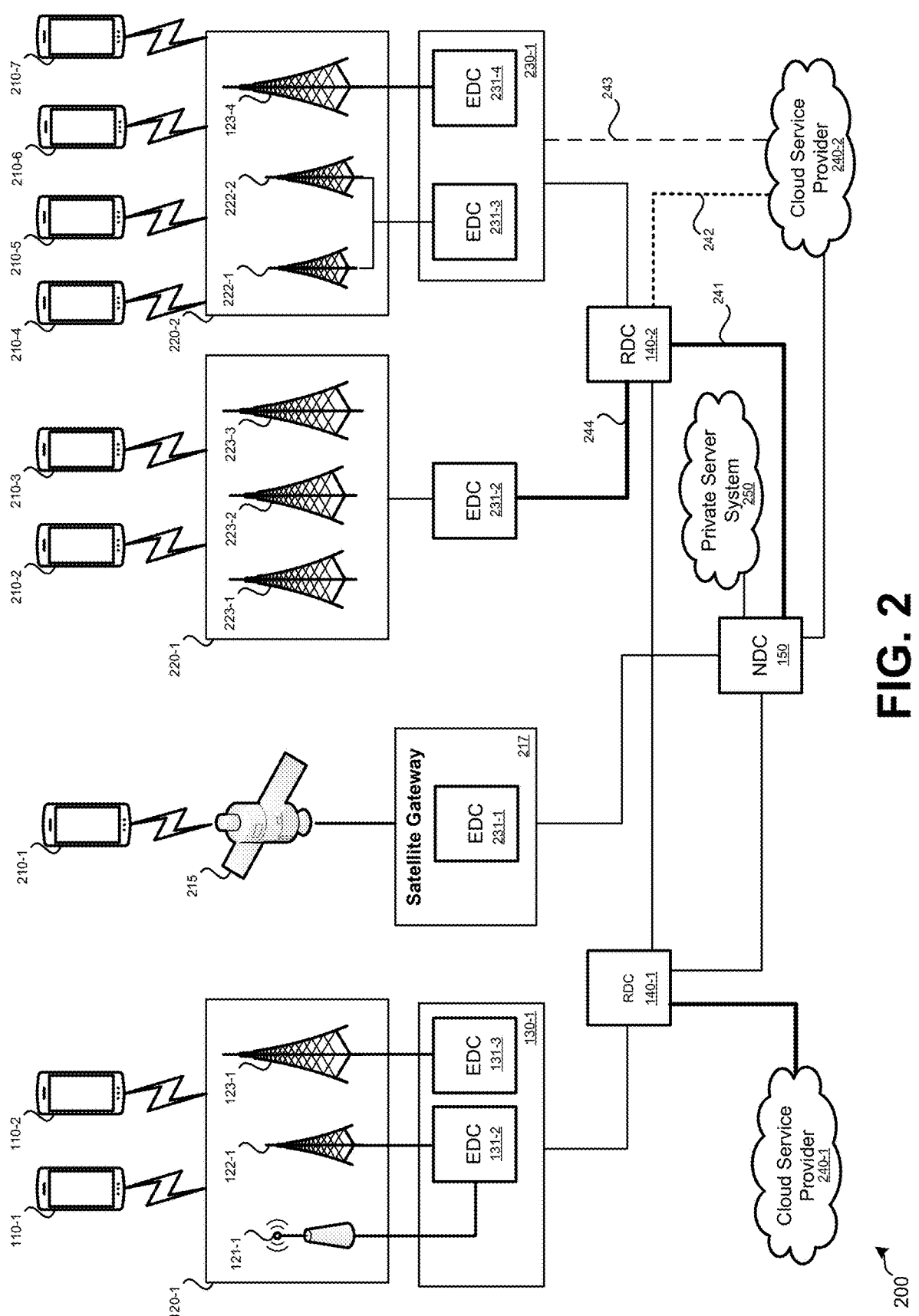
FIG. 2 illustrates an embodiment of a more complex hierarchical cellular network.

FIG. 2 illustrates an embodiment of a more complex hierarchical cellular network more representative of a real-world cellular network hierarchy that may be present. In system 200, variations in components within the cellular network may exist. UE 110-1 and UE 110-2 may communicate with RAN components 120-1 as described in relation to system 100. However, in system 200, only two EDCs may be present in group of EDCs 130-1 and each EDC of group of EDCs 130-1 may not be able to communicate directly with each other. Each EDC of group of EDCs 130-1 may communicate with RDC 140-1.

Various components, such as RDC 140-1 and NDC 150, may communicate with cloud service providers (CSPs) 240. CSPs may represent third-party service providers that provide storage and processing functionality that can be used by various entities. For instance, an entity that may operate a variety of UEs on system 200 may have storage and processing functions hosted by either cloud service provider 240-1 or CSP 240-2. Additionally or alternatively, an entity may operate a private server system, such as private server system 250, that has storage and processing capabilities dedicated to the entity. CSPs 240 and private server system 250 may only have dedicated bandwidth with certain components of the cellular core network. For example, cloud service provider 240-1 has dedicated bandwidth with RDC 140-1. Therefore, for example, if UE 210-6 requests data from CSP 240-1, the request would possibly be routed through RDC 140-2, NDC 150, and RDC 140-1 or RDC 140-2 and RDC 140-1.

In system 200, not all wireless communication may be terrestrial. Rather, UE 210-1 may be a satellite modem or satellite phone that communicates via a low earth orbit (LEO), middle earth orbit (MEO), or geosynchronous earth orbit (GEO) satellite 215. Satellite 215 may relay communications between UE 210-1 and satellite gateway 217, which can include or be in communication with EDC 231-1. As a possible deviation from the hierarchy of system 100, rather than EDC 231-1 being in communication with an RDC, EDC 231-1 may communicate directly with NDC 150. Therefore, for example, if data is to be routed by UE 210-1 to UE 110-1, EDC 231-1 may route the data through NDC 150 to RDC 140-1 to EDC 131-2.

In system 200, not every group of RAN components includes the same equipment. For example, group of RAN components 220-1 includes three large BSs 223-1, 223-2, and 223-3 which are all serviced by EDC 231-1. In the example of FIG. 2, there is a high volume of UE (as represented by UE 210-4, UE 210-5, UE 210-6, and UE 210-7) communicating with group of RAN components 220-2. Ran components 220-2, which includes two small base stations 222-1 and 222-3 and a single large BS 123-4, are serviced by two EDCs, 231-3, and 231-4 of group of EDCs 230-1. Group of EDCs 230-1 has dedicated bandwidth to communicate with CSP 240-2. Therefore, it should be understood that the number and types of RAN components that communicate with an EDC can vary. Further, the components of the cellular core network that the EDC communicates with can also vary.

The amount of bandwidth available between components of the cellular core network may be adjusted such that certain performance metrics can be realized. For example, UEs 210-2 and 210-3 may require a certain minimum quality of service (QoS) metric (e.g., latency, bandwidth, etc.) be met for communication with some remote system, such as private server system 250. In order to meet the QoS metric, additional dedicated bandwidth 244 may be established between EDC 231-2 and RDC 140-2 and dedicated bandwidth 241 may be established between RDC 140-2 and NDC 150.

Dedicated bandwidth within the hierarchy of the cellular core network may be established between components to help realize particular QoS metrics. For instance, RDC 140-1 and RDC 140-2 may have direct dedicated bandwidth between them, such as to increase the bandwidth and decrease the latency for EDC 231-2 and EDC 231-3 to access CSP 240-1.

System 200 may be able to accommodate smart routing, which can be used to compensate for unavailable connections. For instance, RDC 140-2 may typically have dedicated bandwidth 242 to CSP 240-2; however, dedicated bandwidth 242 may not be available due to a problem or maintenance being performed. Data that would be routed directly between RDC 140-2 and CSP 240-2 can instead be routed via NDC 150.

The number and arrangement of UEs, BSs, EDCs, RDCs, NDC, CSPs, and private server systems of system 200 are merely examples. Further, the connections between such components are merely an example of how such a network can be arranged. A real-world cellular network deployed over a large geographical area would be significantly more complex and include a greater number of components.

Figure 3:
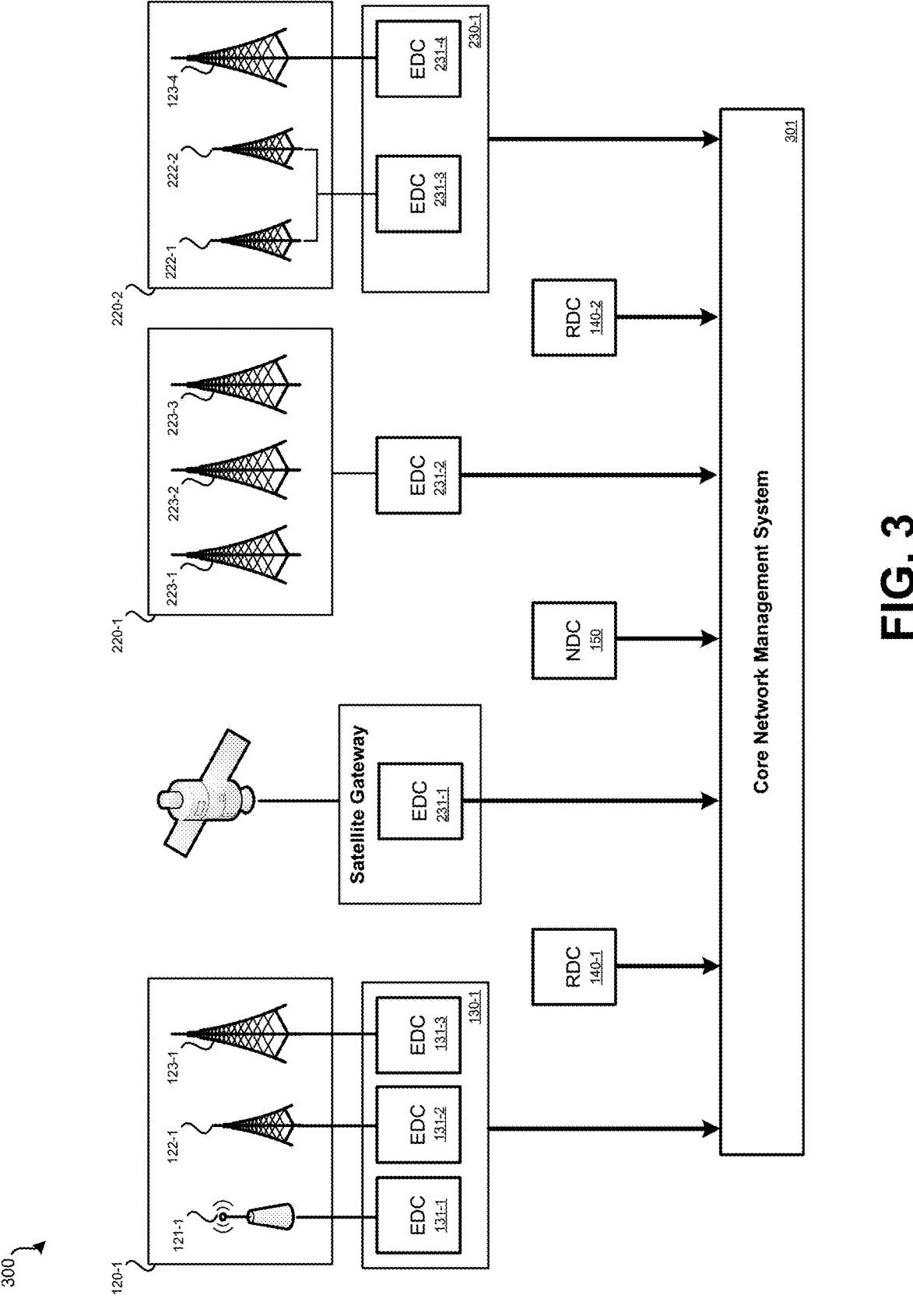
FIG. 3 illustrates an embodiment of a core network management system operating within a core network of a cellular network.

FIG. 3 illustrates an embodiment of a core network management system operating within a core network of a cellular network system 300. Cellular network system 300 can represent an embodiment of system 200 with the addition of core network management system (CNMS) 301.

CNMS 301 can be implemented using a server system that obtains performance data from the various components of the cellular core network. CNMS 301 may request or may automatically receive status data (which can be time-stamped) from all EDCs, RDCs, and an NDC of a cellular core network. If a greater number of tiers of components are present in a cellular network's core network, CNMS 301 receives status data from such components also. The status data received by CNMS 301 can include: number of UEs being serviced; amount of bandwidth used; amount of bandwidth available; latency between components of the core network; and connections available in the core network. CNMS 301 from EDCs may receive performance data about RAN components. For instance, CNMS 301, from an EDC, may receive status data indicating: available radio bandwidth and number of UE actively communicating with a BS or local AP.

CNMS 301 may collect such status data for multiple purposes. First, the status data may be used to create a map of the current performance of the cellular core network and the capabilities of the cellular core network. Second, the status data may be used to produce a usage map of the cellular network over time. For instance, various portions of the core cellular network may be highly utilized during certain times of the day or during certain events (e.g., a sporting event that results in a large number of UEs being present at a location, such as a stadium).

In some embodiments, each component of the cellular core network periodically or occasionally sends status data to CNMS 301. In other embodiments, CNMS 301 transmits queries to each component of the cellular core network and, in response, receives status data. In still other embodiments, a mix of queries and periodic or intermittent reporting is used.

Figure 4:
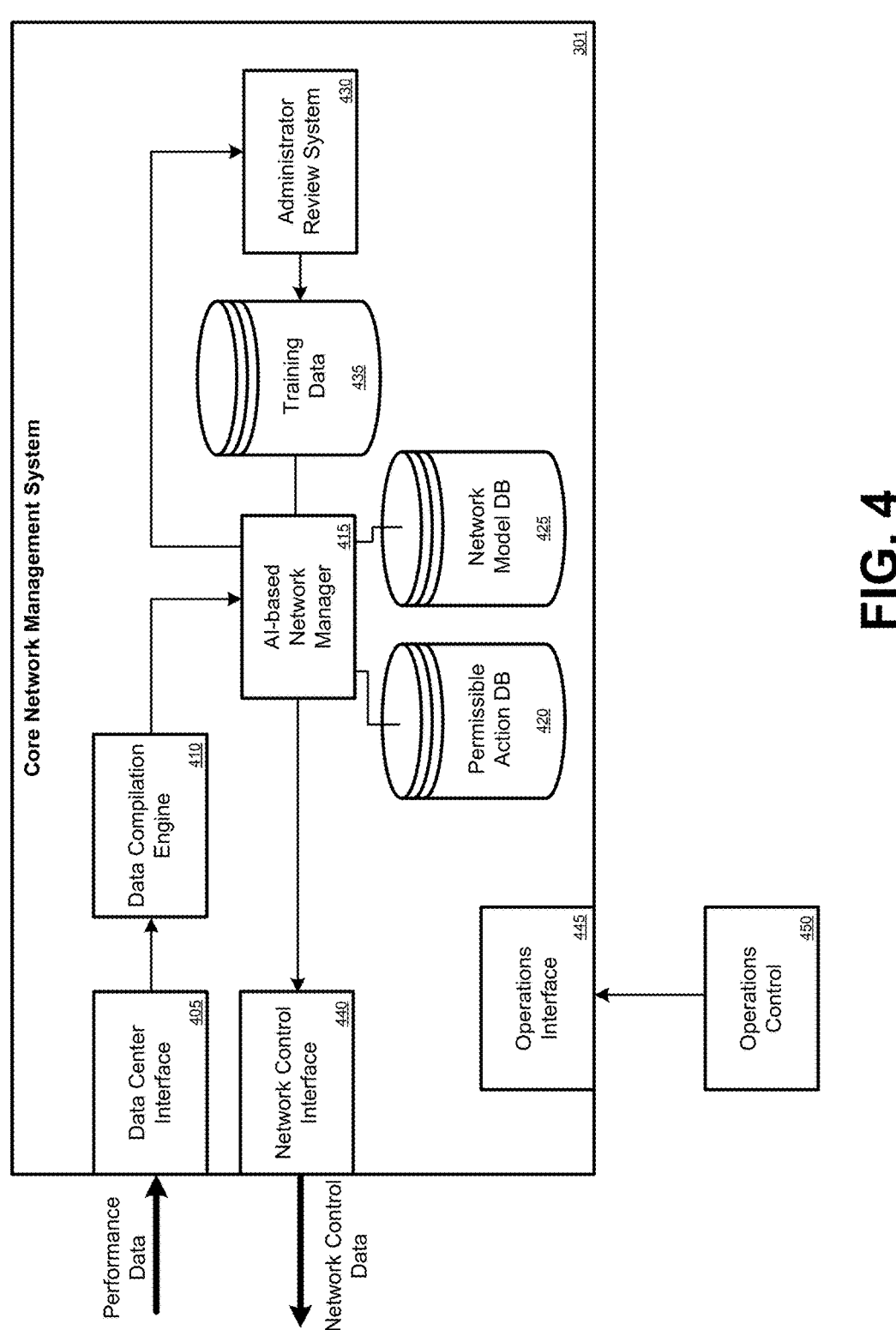
FIG. 4 illustrates an embodiment of a core network management system.

FIG. 4 illustrates an embodiment of CNMS 400. CNMS 301 may be implemented using one or more computer server systems that include one or more non-transitory processor readable mediums and one or more processors. CNMS 301 can include: data center interface 405; data compilation engine 410; AI-based network manager 415; permissible action database (DB) 420; network model DB 425; administrator review system 430; training data 435; network control interface 440; operations interface 445; and operations control 450. Various components of CNMS 301 can be implemented using special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Data center interface 405 may receive status data from each component of the cellular core network. As previously detailed, data center interface 405 may query cellular core network components for such data or may periodically or intermittently receive such data. Status data, as it is received, may be passed to data compilation engine 410. Data compilation engine 410 may collect status data for a period of time (e.g. several seconds, several minutes, for an hour, etc.) and create a dataset that represents the current properties of the cellular network, including used and available capacity, latency between nodes, used and available bandwidth, used and available radio capacity per BS and AP, etc. Data compilation engine 410 may pass the dataset that represents the current properties of the cellular network to AI-based network manager 415 and network model DB 425. Network model DB 425 may store status data of the cellular network over time. Therefore, network model DB 425 can be used to determine network usage at various times of the day and days of the week. Network model DB 425 may further be used to identify network usage in particular geographic regions based on local events, such as sporting events, commuter traffic, etc.

AI-based network manager 415 may be initially trained using training data 435. Training data 435 includes data that represents previous or hypothetical network statuses and how the cellular network should be modified in response. AI-based network manager 415 may be a machine learning model that is trained using training data 435. As much training data 435 becomes available, AI-based network manager 415 can continue to be retrained. As inputs, data may be received by AI-based network manager 415 from data compilation engine 410 and network model DB 425. Therefore, AI-based network manager 415 receives a dataset representing the current status of the cellular network and also data that represents historical statuses of the cellular network over time. AI-based network manager 415 may also have access to permissible action DB 420. Permissible action DB 420 may define what actions AI-based network manager 415 is permitted and not permitted to perform on the cellular network. It may not be permitted for AI-based network manager 415 to make certain changes to the network (e.g., for cost reasons, because the physical infrastructure does not exist, etc.). For example, it may not be possible to have dedicated bandwidth between certain nodes of the cellular network or bandwidth may not be able to be increased beyond a defined amount between certain nodes.

The trained model of AI-based network manager 415, using some or all of the three inputs (from data compilation engine 410, network model DB 425, and permissible action DB) may output one or more modifications to be performed to the core cellular network. The modifications that can be output by AI-based network manager 415 can include: 1) increasing an amount of bandwidth available between two nodes; 2) establishing a direct connection between two nodes such that an initial amount of bandwidth available directly between two nodes is established; 3) establishing a new route for data being sent between two nodes within the cellular network; 4) establishing a new connection to a CSP or private server system; and 5) increasing bandwidth available to a CSP or private server system. If overcapacity is detected, decreases in bandwidth or the severing of direct connections between nodes can also be recommended, such as: 1) decreasing an amount of bandwidth available between two nodes; 2) severing a direct connection between two nodes such that no bandwidth is available directly between two nodes; 3) establishing a new route for data being sent between two nodes within the cellular network; 4) removing a connection to a CSP or private server system; and 5) decreasing bandwidth available to a CSP or private server system.

When AI-based network manager 415 determines a modification to be implemented by the cellular core network, the modification may be output via network control interface 440. The modification may be transmitted to the system that can enact the modification. In some embodiments, the modification may be implemented by the system without any input by an administrator. For example, through an application programming interface (API), it may be possible for AI-based network manager 415 to request that bandwidth between two nodes be increased, decreased, or established, even if the connection is managed by a third-party (e.g., an operator of a Tier 1 IP network). In some situations, an administrator may be required to approve or implement the change output by AI-based network manager 415. For instance, a modification requested by AI-based network manager 415 may require an administrator to approve, due to a cost associated with the modification, a hardware change that may be needed to complete the modification, and/or a modification requiring that an administrator contact a third-party provider to implement the modification.

For modifications implemented automatically without administrator input or modifications implemented with administrator input, the modification output by AI-based network manager 415, along with the relevant inputs from data compilation engine 410, network model DB 425, and permissible action DB 420 may be output to administrator review system 430. Administrator review system 430 may be used by an administrator to either approve or tweak how AI-based network manager 415 should have modified the network in response to the data. The response (which may have been tweaked or otherwise modified) and the data on which the AI-based network manager 415 determined the modification may be added to training data 435. Training data 435 may then be used to retrain AI-based network manager 415 in order to improve the quality of recommendations made by AI-based network manager 415.

Operations control 450 may represent a system external to CNMS 301 through which provisioning requests may be received from clients. A client may desire to have some number of UE (e.g., tens, hundreds, thousands) activated on the cellular network. Such a client may submit, as part of the provisioning request, one or more QoS metrics. The QoS metrics may define an amount of uplink and/or downlink bandwidth required to be reserved for the client (e.g., to communicate with a private server system or a particular CSP) and/or a maximum latency for uplink and/or downlink communications to communicate with a private server system or particular CSP. Other QoS metrics may also be defined as part of the provisioning request. The provisioning request may also indicate the geographic regions in which the QoS metrics are required or the geographic regions in which the wireless devices of the client are permitted to operate. For example, the QoS metrics may only be required to be met in geographic locations indicated as part of the provisioning request.

Operations interface 445 may receive the provisioning request and may pass provisioning data to AI-based network manager 415 as an input. Based upon the number of UE, the geographic location where service is requested, and the requested QoS metrics, AI-based network manager 415 may determine modifications that are to be implemented on the cellular core network in anticipation of the UE of the client being activated on the cellular network. Further, once activated, AI-based network manager 415 may receive status data from nodes of the core cellular network indicating whether uplink and downlink traffic of the client's UE is meeting the QoS metrics of the provisioning request. Therefore, QoS metrics for individual clients may be monitored and the core cellular network may be adjusted to ensure that the QoS metrics are met for the client. For example, referring to FIG. 2, in response to the latency for a client's UE (e.g., UE 210-4 through 210-7) being outside the bound of the client's QoS metrics to communicate with CSP 240-2, direct bandwidth 243 between group of EDCs 230-1 and CSP 240-2 may be established to decrease the latency.

Figure 5:
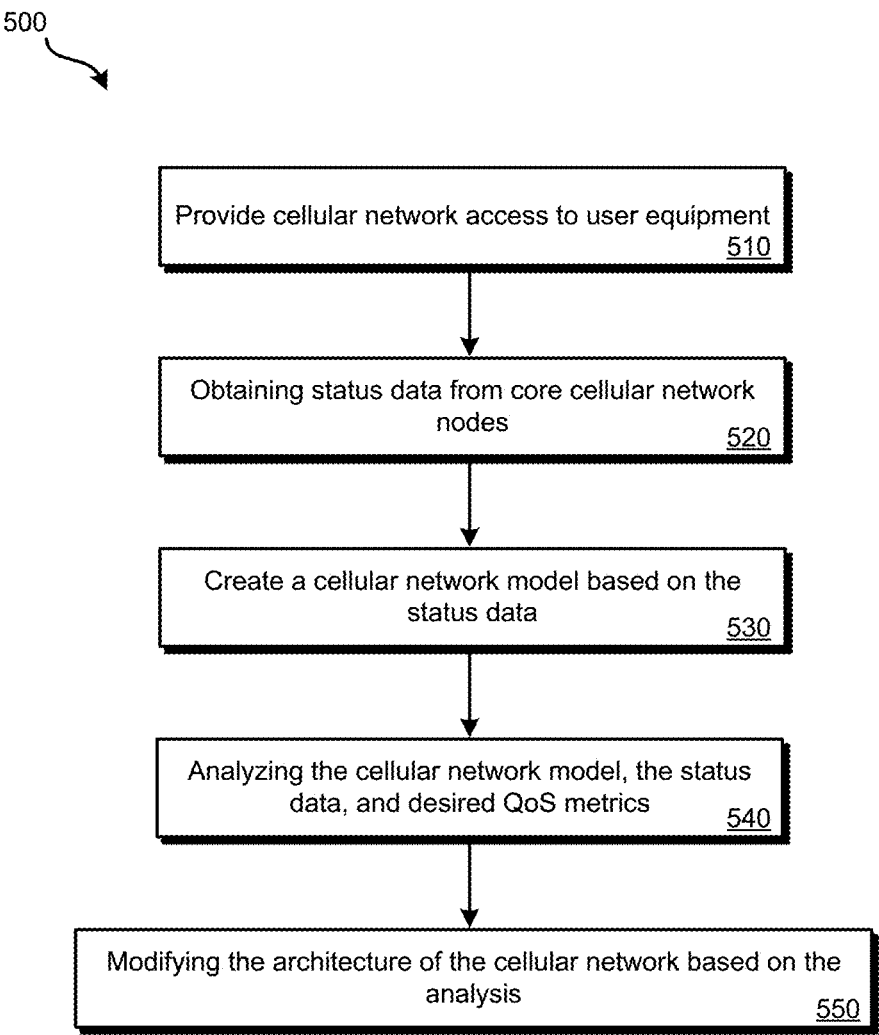
FIG. 5 illustrates an embodiment of a method for modifying a cellular network based on observed and predicted cellular network usage.

Various methods may be performed using the systems and arrangements detailed in FIGS. 1-4. FIG. 5 illustrates an embodiment of a method 500 for modifying a cellular network based on observed and predicted cellular network usage. Method 500 may be performed using a cellular core network, such as detailed in relation to FIGS. 1 and 2. Method 500 can further include the use of a CNMS incorporating (or in communication with) nodes of a cellular core network, as detailed in relation to FIG. 3. A CNMS may have components as detailed in relation to FIG. 4. Each block of method 500 may be performed by a cellular network that includes or is in communication with a CNMS.

At block 510, cellular network access may be provided to UE for multiple clients across the cellular network. The cellular network may be used by the UE for telephone calls, text messaging, and/or data transfer. Uplink data may be sent from UE to a destination within or outside of the cellular network. Downlink data may be received by UE from a destination within or outside of the cellular network.

At block 520, status data may be obtained from some or all core cellular network nodes. The status data may be received by a CNMS that monitors the entirety of the cellular network or the core network of the cellular network. The status data can include: the number of UEs being serviced; the amount of bandwidth used between each node; the amount of bandwidth available between each node; the latency between nodes of the core network; and the connections available in the core network.

At block 530, a cellular network model may be created or updated based on the status data received. The cellular network model may reflect loads and capacities of the cellular network over time. Therefore, the model may be used to predict the load that will exist on various parts of the cellular network at different times and what resources will likely be available or used.

At block 540, an analysis may be performed by the CNMS to determine what modifications should be made to the core cellular network. The analysis can be performed using the current status data, the cellular network model (reflective of trends over time), desired QoS metrics of the cellular network, and data from a permissible modification database. In addition to QoS metrics desired by the operator of the cellular network for the cellular network to meet as a whole, QoS metrics particular to individual clients may be monitored to ensure that clients' UEs are received service in accordance with the QoS metrics. The analysis performed at block 540 may use a machine-learning model that has been trained to determine whether and what modifications should be made to the cellular network to improve performance (e.g., meeting the desired QoS metrics of the cellular network). In some embodiments, the desired QoS metrics may include a range of desired performance. Therefore, if a portion of the cellular network's performance is above a threshold (e.g., too much excess bandwidth available between components), various characteristics can be scaled back (e.g., for cost savings).

At block 550, the architecture of the cellular network may be modified based on the analysis of block 540. The modifications that can be implemented or requested by the CNMS can include: 1) increasing an amount of bandwidth available between two nodes; 2) establishing a direct connection between two nodes such that an initial amount of bandwidth available directly between two nodes is established; 3) establishing a new route for data being sent between two nodes within the cellular network; 4) establishing a new connection to a CSP or private server system; and 5) increasing bandwidth available to a CSP or private server system. If overcapacity based on the QoS metrics is detected, decreases in bandwidth or the severing of direct connections between nodes can also be recommended or directly implemented, such as: 1) decreasing an amount of bandwidth available between two nodes; 2) severing a direct connection between two nodes such that no bandwidth is available directly between two nodes; 3) establishing a new route for data being sent between two nodes within the cellular network; 4) removing a connection to a CSP or private server system; and 5) decreasing bandwidth available to a CSP or private server system.

FIG. 6 illustrates an embodiment of a method for modifying a cellular network based on a client provisioning request. Method 600 may be performed using a cellular core network, such as detailed in relation to FIGS. 1 and 2. Method 600 can further include the use of a CNMS incorporating (or in communication with) nodes of a cellular core network, as detailed in relation to FIG. 3. A CNMS may have components as detailed in relation to FIG. 4. Each block of method 600 may be performed by a cellular network that includes or is in communication with a CNMS.

At block 610, a provisioning request may be received. The provisioning request may be received from a client that desires to have some number of UEs activated on the cellular network. Such a provisioning request may typically be used for large multiples of UEs. For instance, a client that desires a minimum level of service be met for a group of UEs. The provisioning request may include: 1) identifiers (and a total number) of UEs; 2) one or more geographical regions (e.g., counties, countries, states, defined areas, etc.) where the UEs will be operating; 3) QoS metrics that are to be met; 4) access to one or more CSPs or private server systems required to be available to the UEs.

At block 620, status data may be obtained from some or all nodes of the cellular core network. The status data may be received by a CNMS that monitors the entirety of the cellular network or the core network of the cellular network. The status data can include: the number of UEs being serviced; amount of bandwidth used between each node; the amount of bandwidth available between each node; the latency between nodes of the core network; and the connections available in the core network. Additionally or alternatively, at block 620, a cellular network model may be created or updated based on the status data received. The cellular network model may reflect loads and capacities of the cellular network over time. Therefore, the model may be used to predict the load that will exist on various parts of the cellular network at different times and what resources will likely be available or used.

At block 630, an analysis may be performed by the CNMS to determine the time-varying loads on the core cellular network and the current performance. The analysis can be performed using the current status data, the cellular network model (reflective of trends over time), and, possibly, data from a permissible modification database. At block 640, the provisioning request may be analyzed. In some embodiments, blocks 630 and 640 are performed as a single block. The provisioning request may be analyzed to determine how the additional load on the cellular network caused by the UE identified in the provisioning request will affect performance of various portions of the core cellular network. The analysis performed at blocks 630 and 640 may use a machine-learning model that has been trained to determine whether and what modifications should be made to the cellular network to improve performance (e.g., meeting the QoS metrics of the provisioning request for the UE mapped to the client).

At block 650, the architecture of the cellular network may be modified based on the analysis of blocks 630 and 640. The modifications that can be implemented or requested by the CNMS can include: 1) increasing an amount of bandwidth available between two nodes; 2) establishing a direct connection between two nodes such that an initial amount of bandwidth available directly between two nodes is established; 3) establishing a new route for data being sent between two nodes within the cellular network; 4) establishing a new connection to a CSP or private server system; 5) increasing bandwidth available to a CSP or private server system. These modifications may be in anticipation of the UE of the provisioning request being activated on the cellular network. Alternatively, the modifications may be implemented after the actual effect of the UE on the network has been detected. For instance, if the QoS metrics for the UE of the particular client are not being met, the cellular core network may be modified.

At block 660, the configuration of the cellular network may be orchestrated to allow activation of the UE of the client on the cellular network. Following activation, a method, such as method 500, may be performed repeatedly to ensure that the QoS metrics for the client's UEs are met. If they are not met, modifications to the architecture of the cellular core network may be made.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for managing a core cellular network of a cellular network, the method comprising:

receiving, by a core network management system, a provisioning request for a plurality of user equipment (UE) from a client, wherein:

the provisioning request comprises a quality of service (QoS) metric required to be met by the cellular network; and the provisioning request indicates a geographic location where the plurality of UE will connect with the cellular network;

obtaining, by the core network management system, performance data from a plurality of edge data centers within a plurality of cellular network-data centers, performance data comprising:

status data indicative of a count of UE actively communicating with radio access network (RAN) components in communication with each edge data center of the plurality of edge data centers, and availability data indicative of a count of connections available to the RAN components in communication with each edge data center of the plurality of edge data centers, wherein the plurality of cellular network data centers comprise data centers of different tiers within a hierarchy of the core cellular network;

analyzing, by the core network management system, the performance data from the plurality of edge data centers and the provisioning request, wherein analyzing the performance data and the provisioning request comprises analyzing the geographic location where the plurality of UE are to connect with the cellular network, the status data, and the availability data; and modifying, by the core network management system, an architecture of the core cellular network to accommodate the plurality of UE at the indicated geographic location based on analyzing the performance data, the geographic location where the plurality of UE will connect with the cellular network, the status data, the availability data, and the provisioning request, wherein modifying the architecture of the core cellular network comprises:

reserving a dedicated amount of bandwidth in the geographic location on a radio access network (RAN) of the cellular network based on the provisioning request; and establishing a new connection between an edge data center of the plurality of edge data centers and a cloud service provider not directly communicating with the edge data center.

2. The method for managing the core cellular network of the cellular network of claim 1, wherein modifying the architecture of the core cellular network comprises obtaining dedicated bandwidth between two data centers of the plurality of cellular network data centers which previously did not communicate directly.

3. The method for managing the core cellular network of the cellular network of claim 1, wherein modifying the architecture of the core cellular network comprises increasing dedicated bandwidth between two data centers of the plurality of cellular network data centers which previously communicated directly.

4. The method for managing the core cellular network of the cellular network of claim 1, further comprising:

maintaining, by the core network management system, a cellular network model that comprises: a representation of the plurality of cellular network data centers; reservations of bandwidth on the RAN of the cellular network; bandwidth available between cellular network data centers of the plurality of cellular network data centers; and bandwidth available between cellular network data centers and cloud service providers.

5. The method for managing the core cellular network of the cellular network of claim 1, wherein:

analyzing the performance data from the plurality of cellular network data centers and the provisioning request comprises using a pre-trained machine learning model.

6. A cellular network system of a cellular network, comprising: a core network management system, comprising:

a data center interface;

a network control interface;

an operations interface;

one or more processors, configured to:

receive a provisioning request for a plurality of user equipment (UE) from a client via the operations interface, wherein:

the provisioning request comprises a quality of service (QoS) metric required to be met by the cellular network; and the provisioning request indicates a geographic location where the plurality of UE will connect with the cellular network;

obtain performance data from a plurality of edge data centers within a plurality of cellular network data centers via the data center interface, performance data comprising:

status data indicative of a count of UE actively communicating radio access network (RAN) components in communication with each edge data center of the plurality of edge data centers, and availability data indicative of a count of connections available to the RAN components in communication with each edge data center of the plurality of edge data centers, wherein the plurality of cellular network data centers comprise data centers of different tiers within a hierarchy of a core cellular network;

analyze the performance data from the plurality of edge data centers and the provisioning request, wherein analyzing the performance data and the provisioning request comprises analyzing the geographic location where the plurality of UE are to connect with the cellular network, the status data, and the availability data; and cause an architecture of the core cellular network to be modified to accommodate the plurality of UE at the indicated geographic location via the network control interface based on analyzing the performance data, the geographic location where the plurality of UE will connect with the cellular network, the status data, the availability data, and the provisioning request, wherein modifying the architecture of the core cellular network comprises:

reserving a dedicated amount of bandwidth in the geographic location on a radio access network (RAN) of the cellular network based on the provisioning request; and establishing a new connection between an edge data center of the plurality of edge data centers and a cloud service provider not actively communicating with the edge data center.

7. The cellular network system of claim 6, wherein the plurality of cellular network data centers comprise: a national data center; a plurality of regional data centers; and a plurality of edge data centers.

8. The cellular network system of claim 7, wherein an edge data center of the plurality of edge data centers is part of a satellite gateway.

9. The cellular network system of claim 7, wherein the one or more processors being configured to cause the architecture of the core cellular network to be modified comprises the one or more processors causing dedicated bandwidth to be obtained between two data centers of the plurality of cellular network data centers which previously did not communicate directly.

10. The cellular network system of claim 7, wherein the one or more processors being configured to cause the architecture of the core cellular network to be modified comprises the one or more processors being configured to increase dedicated bandwidth between two data centers of the plurality of cellular network data centers which previously communicated directly.

11. The cellular network system of claim 6, further comprising a cellular network model database that comprises:

a representation of the plurality of cellular network data centers;

reservations of bandwidth on the RAN of the cellular network;

bandwidth available between cellular network data centers of the plurality of cellular network data centers; and bandwidth available between cellular network data centers and cloud service providers.

12. The cellular network system of claim 7, further comprising an artificial-intelligence based network manager that:

analyzes the performance data from the plurality of cellular network data centers; and creates the provisioning request based on a pre-trained machine learning model.

13. A non-transitory processor-readable medium comprising processor-readable instructions configured to cause one or more processors of a cellular network to:

receive a provisioning request for a plurality of user equipment (UE) from a client, wherein the provisioning request comprises a quality of service (QoS) metric required to be met by the cellular network; and the provisioning request indicates a geographic location where the plurality of UE will connect with the cellular network;

obtain performance data from a plurality of edge data centers within a plurality of cellular network data centers, performance data comprising:

status data indicative of a count of UE actively communicating radio access network (RAN) components in communication with each edge data center of the plurality of edge data centers, and availability data indicative of a count of connections available to the RAN components in communication with each edge data center of the plurality of edge data centers, wherein the plurality of cellular network data centers comprise data centers of different tiers within a hierarchy of a core cellular network;

analyze the performance data from the plurality of edge data centers and the provisioning request using a machine-learning model, wherein analyzing the performance data and the provisioning request comprises analyzing the geographic location where the plurality of UE are to connect with the cellular network, the status data, and the availability data; and cause an architecture of the core cellular network to be modified to accommodate the plurality of UE at the indicated geographic location based on analyzing the performance data, the geographic location where the plurality of UE will connect with the cellular network, the status data, the availability data, and the provisioning request using the machine-learning model, wherein modifying the architecture of the core cellular network comprises:

reserving a dedicated amount of bandwidth in the geographic location on a radio access network (RAN) of the cellular network based on the provisioning request; and establishing a new connection between the edge data center and a cloud service provider not actively communicating with the edge data center.

* * * * *